United States Patent
Bodin et al.

(10) Patent No.: US 8,027,843 B2
(45) Date of Patent: *Sep. 27, 2011

(54) ON-DEMAND SUPPLEMENTAL DIAGNOSTIC AND SERVICE RESOURCE PLANNING FOR MOBILE SYSTEMS

(75) Inventors: Willam Kress Bodin, Austin, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

This patent is subject to a terminal disclaimer.

(21) Appl. No.: 11/263,713

(22) Filed: Nov. 1, 2005

(65) Prior Publication Data

US 2006/0052921 A1 Mar. 9, 2006

Related U.S. Application Data

(63) Continuation-in-part of application No. 10/980,728, filed on Nov. 3, 2004, now Pat. No. 6,983,200, which is a continuation of application No. 10/290,399, filed on Nov. 7, 2002, now Pat. No. 6,847,872.

(51) Int. Cl.
*G06Q 40/00* (2006.01)
(52) U.S. Cl. .............................. 705/1; 705/30
(58) Field of Classification Search ........... 705/1, 10–44
See application file for complete search history.

(56) References Cited

U.S. PATENT DOCUMENTS

| | | | |
|---|---|---|---|
| 4,965,821 A | 10/1990 | Bishop et al. | |
| 5,210,789 A | 5/1993 | Jeffus et al. | |
| 5,214,582 A | 5/1993 | Gray | |
| 5,442,553 A | 8/1995 | Parrillo | |
| 5,499,295 A * | 3/1996 | Cooper | 380/270 |
| 5,619,412 A | 4/1997 | Hapka | |
| 5,815,071 A | 9/1998 | Doyle | |
| 5,831,992 A * | 11/1998 | Wu | 714/732 |
| 5,898,680 A | 4/1999 | Johnstone et al. | |
| 5,922,037 A | 7/1999 | Potts | |
| 5,948,040 A | 9/1999 | DeLorme et al. | |
| 5,999,908 A * | 12/1999 | Abelow | 705/7 |

(Continued)

OTHER PUBLICATIONS

M2 Presswire Coventry, Openwave Systems: Openwave Download Manager delivers Java to mobile subscribers; Games, rigntones, images and more, easy to access, purchase and store, Sep. 27, 2002, p. 1.*

(Continued)

*Primary Examiner* — Frantzy Poinvil
(74) *Attorney, Agent, or Firm* — Robert H. Frantz; Libby Z. Toub

(57) ABSTRACT

Enhanced diagnostic service is provided by determining availability of and downloading a supplemental diagnostic function to isolate a failure according to a service signal from a mobile system; coalescing offers for a repair service according to results of the execution of the downloaded diagnostic function; presenting the offers to an operator of the mobile system; executing the diagnostic function by an on-demand computing system wherein transactions provided by the diagnostic function are automatically shared by simultaneously serving multiple customers; differentiating and recording each customer's usage of the diagnostic functions according to one or more parameters included in the transactions, the parameters uniquely identifying each customer and a type of transaction conducted for that customer; and, responsive to a number of simultaneous transactions to any one server exceeding a performance limit of a given server, automatically accessing one or more additional servers to increase capacity and to share workload.

10 Claims, 8 Drawing Sheets

U.S. PATENT DOCUMENTS

| | | | |
|---|---|---|---|
| 6,064,971 | A | 5/2000 | Hartnett |
| 6,067,570 | A | 5/2000 | Kreynin et al. |
| 6,083,248 | A | 7/2000 | Thompson |
| 6,094,609 | A | 7/2000 | Arjomand |
| 6,105,063 | A | 8/2000 | Hayes, Jr. |
| 6,285,931 | B1 | 9/2001 | Hattori et al. |
| 6,285,967 | B1 | 9/2001 | Rajan et al. |
| 6,289,382 | B1 | 9/2001 | Bowman-Amuah |
| 6,292,724 | B1 | 9/2001 | Apsell et al. |
| 6,313,786 | B1 | 11/2001 | Sheynblat et al. |
| 6,330,499 | B1 | 12/2001 | Chou et al. |
| 6,339,736 | B1 | 1/2002 | Moskowitz et al. |
| 6,362,730 | B2 | 3/2002 | Razavi et al. |
| 6,370,454 | B1 | 4/2002 | Moore |
| 6,529,808 | B1 | 3/2003 | Diem |
| 6,571,279 | B1 | 5/2003 | Herz et al. |
| 6,640,166 | B2 | 10/2003 | Liebl et al. |
| 6,647,328 | B2 | 11/2003 | Walker |
| 6,691,253 | B1 * | 2/2004 | Gillenwater et al. ........... 714/36 |
| 6,717,527 | B2 | 4/2004 | Simon |
| 6,718,235 | B1 | 4/2004 | Borugian |
| 6,748,322 | B1 | 6/2004 | Fernandez |
| 6,754,485 | B1 | 6/2004 | Obradovich et al. |
| 6,801,604 | B2 | 10/2004 | Maes et al. |
| 6,822,557 | B1 | 11/2004 | Weber |
| 6,847,872 | B2 * | 1/2005 | Bodin et al. .................... 701/33 |
| 6,877,661 | B2 | 4/2005 | Webb et al. |
| 6,961,760 | B2 | 11/2005 | Li et al. |
| 6,978,316 | B2 | 12/2005 | Ghaffar et al. |
| 7,054,648 | B2 | 5/2006 | Abtin et al. |
| 7,171,189 | B2 | 1/2007 | Bianconi et al. |
| 7,200,566 | B1 | 4/2007 | Moore et al. |
| 2001/0029478 | A1 | 10/2001 | Laster et al. |
| 2001/0036224 | A1 | 11/2001 | Demello et al. |
| 2001/0037168 | A1 | 11/2001 | Hozuka |
| 2001/0056396 | A1 | 12/2001 | Goino |
| 2001/0056544 | A1 | 12/2001 | Walker et al. |
| 2002/0044049 | A1 | 4/2002 | Saito et al. |
| 2002/0045976 | A1 | 4/2002 | Kodama |
| 2002/0049535 | A1 | 4/2002 | Rigo et al. |
| 2002/0057678 | A1 | 5/2002 | Jiang et al. |
| 2002/0077780 | A1 | 6/2002 | Liebl et al. |
| 2002/0077781 | A1 | 6/2002 | Liebl et al. |
| 2002/0119766 | A1 | 8/2002 | Bianconi et al. |
| 2002/0120685 | A1 | 8/2002 | Srivastava et al. |
| 2003/0009401 | A1 | 1/2003 | Ellis |
| 2003/0017826 | A1 | 1/2003 | Fishman et al. |
| 2003/0078019 | A1 | 4/2003 | Dorenbsoch et al. |
| 2003/0093187 | A1 | 5/2003 | Walker et al. |
| 2003/0130893 | A1 | 7/2003 | Farmer |
| 2003/0158894 | A1 | 8/2003 | Ziserman |
| 2003/0163249 | A1 | 8/2003 | Kapolka et al. |
| 2003/0172090 | A1 | 9/2003 | Asunmaa et al. |
| 2003/0195845 | A1 | 10/2003 | Anton et al. |
| 2004/0010592 | A1 | 1/2004 | Carver et al. |
| 2004/0030995 | A1 | 2/2004 | Bhogal et al. |
| 2004/0064258 | A1 | 4/2004 | Ireland |
| 2004/0064268 | A1 * | 4/2004 | Gillenwater et al. ........... 702/40 |
| 2004/0125755 | A1 | 7/2004 | Roberts |
| 2004/0198381 | A1 | 10/2004 | Siegel et al. |
| 2004/0203581 | A1 | 10/2004 | Sharon et al. |
| 2004/0205694 | A1 | 10/2004 | James et al. |
| 2004/0215665 | A1 | 10/2004 | Edgar et al. |
| 2006/0274896 | A1 | 12/2006 | Livesay |

OTHER PUBLICATIONS

M2 PressWire, SHARP: Sharp introduces the new personal information tool, Apr. 15, 1999, p. 1.*

Beniaminy et al., Delivering diagnostic solutions with cost expert systems; A case study, 1999, IEEE, p. 367-371.*

IBM, "Information Everywhere—New Opportunities for Pervasive Technology", IBM Corporation, Mar. 2000, downloaded from http://www.ibm.com, 8 pages.

Coleman, Jules; "Markets, Morals, and the Law", Oct. 2002, Oxford University Press, pp. 87-91, 94, 98, 104-105.

USPTO, examination correspondence from related U.S. Appl. No. 12/184,217, retrieved on Jan. 22, 2010.

IBM Corp.; "Inforomation Everywhere—New Opportunities for Pervasive Technology"; Mar. 2000, retrieved from http://www.ibm.com; 8 pages.

USPTO; Image File Wrapper including Office Actions, Applicant Replies, Amendements and Information Disclosure Statements from U.S. Appl. No. 10/232,246, filed by William Bodin on Aug. 29, 2002, 357 pages.

USPTO; Image File Wrapper contents from U.S. Appl. No. 10/980,728, now U.S. patent 6,963,200; as retrieved on Nov. 13, 2009.

Benjaminy et al.; Delivering diagnostic solutions with cost expert systems; A case study, 1999, IEEE, p. 367-371, U.S. Appl. No. 10/980,728.

USPTO; Internet File Wrapper containing Office Actions, Applicant Replies and Information Disclosure Statements from U.S. Appl. No. 10/290,381, filed Nov. 7, 2002, now abandoned.

IBM Corp.; "Inforomation Everywhere—New Opportunities for Pervasive Technology"; Mar. 2000, retrieved from http://www.ibm.com; 8 pages.

U.S. Appl. 11/843,945, filed Aug. 23, 2007, currently pending.

U.S. Appl. No. 10/290,399, filed Nov. 7, 2002, issued as US patent 6,847,872, filed by William Kress Bodin on Nov. 7, 2002.

United States Patent Office, U.S. Appl. No. 10/980,728, filed Nov. 3, 2004, issued as US patent 6,983,200, filed by William Kress Bodin on Nov. 3, 2004, published at and retrieved from http://www.uspto.gov Image File Wrapper (IFW) on Mar. 4, 2010.

United States Patent Office, U.S. Appl. No. 10/290,381, filed Nov. 7, 2002, now abandoned, filed by William Kress Bodin on Nov. 7, 2002, published at and retrieved from http://www.uspto.gov Image File Wrapper (IFW) on Mar. 4, 2010.

United States Patent Office, U.S. Appl. No. 10/290,223, filed Nov. 7, 2002, issued as US patent 7,346,439, filed by William Kress Bodin on Nov. 7, 2002 published at and retrieved from http://www.uspto.gov Image File Wrapper (IFW) on Mar. 4, 2010.

United States Patent Office, U.S. Appl. No. 10/290,391, filed Nov. 7, 2002, issued as US patent 7,447,642, filed by William Kress Bodin on Nov. 7, 2002, published at and retrieved from http://www.uspto.gov Image File Wrapper (IFW) on Mar. 4, 2010.

United States Patent Office, U.S. Appl. No. 10/290,390, filed Nov. 7, 2002, now abandoned, filed by William Kress Bodin on Nov. 7, 2002 published at and retrieved from http://www.uspto.gov Image File Wrapper (IFW) on Mar. 4, 2010.

USPTO; Notice of Allowance dated Jan. 27, 2010 in related U.S. Appl. No. 10/232,246, filed Aug. 29, 2002 by William Kress Bodin.

PR Version staff, Navstar GPS user equipment introduction, Sep. 1996, Navstar, pp. 1-20.

USPTO; recent examination correspondence in related U.S. Appl. No. 10/232,246, filed by William Kress Bodin on Aug. 29, 2001, now under Notice of Allowance.

USPTO; recent notice of allowance dated Apr. 27, 2011 in related U.S. Appl. No. 10/232,246, filed on Aug. 29, 2002 by William Kress Bodin.

* cited by examiner

ON-DEMAND SUPPLEMENTAL DIAGNOSTIC AND SERVICE RESOURCE PLANNING FOR MOBILE SYSTEMS

CROSS-REFERENCE TO RELATED APPLICATIONS (CLAIMING BENEFIT UNDER 35 U.S.C. 120)

This application is a continuation-in-part of U.S. patent application Ser. No. 10/980,728, filed Nov. 3, 2004, now U.S. Pat. No. 6,983,200 which is currently under Notice of Allowance, which is a continuation of U.S. patent application Ser. No. 10/290,399, filed on Nov. 7, 2002, now issued as U.S. Pat. No. 6,847,872, which is related to U.S. patent application Ser. No. 10/232,246, filed on Aug. 29, 2002, which is pending, all of which were filed by William Kress Bodin, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. Nos. 10/980,728; 10/290,399; and 10/232,246 are hereby incorporated by reference in their entireties, including figures.

BACKGROUND OF THE INVENTION

1. Field of the Invention

This invention relates to the technologies of automated and preemptive service determination, brokering and scheduling for moving systems such as automobiles, trains, trucks, ships, and aircraft. The invention relates more particularly to systems for remotely providing enhanced and supplemental diagnostics, and subsequently performing enhanced materials and resource planning based upon such results.

2. Background of the Invention

Vehicles are traditionally designed and built with a finite set of gauges or indicator warning lights which are intended to convey vital operational status to the operator of the vehicle. For example, many automobiles are equipped with a temperature gauge or warning light, and an oil pressure gauge or warning light, on the dashboard. If a temperature gauge enters a range indicating higher than normal operating coolant temperature, the driver may choose to continue driving until a service station is reached. For indicator lights, often referred to as "dummy lights", the light may be illuminated when the temperature has reached a critical point, leaving the driver with even fewer options (e.g. less time to find a service station). Most automobiles, however, are equipped many sensors in the engine, electrical, electronic, and drive train subsystems, which provide more information regarding the status of the engine. This detailed information, however, is not usually presented to the driver, but is maintained in memory by an on-board computer for later analysis by an automotive technician and/or diagnostic computer. During the operation of the vehicle, the on-board computer may simply determine if a sensor indicates a potential problem and decide to illuminate a warning light.

Most modern vehicles, including ships, aircraft, trains, trucks and cars, follow this convention of collecting a large amount of sensor and indicator data from the vehicle's subsystems, storing these data items in memory, and presenting simple, "high level" indicators to the vehicle operator (e.g. pilot, captain, etc.). So, for example, when a driver sees an over-temperature indicator light or notices a temperature gauge in the "hot" range, he must make a fairly uninformed decision as to how to proceed. If he is driving on a highway, he must decide to "chance it" and continue driving until the next town or service center is reached in the hopes that an appropriately-equipped and staffed repair shop will be found. By doing so, he risks causing expensive damage to the vehicle's engine. If he chooses to take such a risk and upon arrival at the next town finds that no appropriately equipped or staffed shop is available, he may have to pay for a tow anyway, thereby finding that he incurred the risk of engine damage unnecessarily (e.g. he could have stopped on the roadside and called for a tow).

This particular problem has become even more pronounced as the automobile industry has diversified in recent years. Many consumers are purchasing vehicles which are made by manufacturers who have small portions of market share in the country where they reside, and thus there are fewer repair centers which are equipped with the diagnostic equipment for his or her particular make-and-model of vehicle and who have appropriately trained staff for the needed repair. In one example, a driver may have a car which cannot be serviced by any shop in the next town because it is manufactured by a company which does not have a dealer in town. In another example situation, a dealer for the driver's car may be in town, but the malfunction may be in a subsystem for which the dealer does not have a trained technician currently on staff or on call (e.g. a problem within the transmission but the dealer has no transmission technicians on staff). A third aspect of whether or not service can be obtained as needed is whether or not a service center has ready access to spare parts and replacement components, as may be required.

All travel is time dependent (e.g. there is an itinerary to be kept), whether it is a road trip in a car by a private consumer, a transoceanic shipment by ship or a scheduled airline flight, and as such, all of these factors must be met in a timely fashion to minimize the economic, social, and financial impact of a vehicle repair:
   (a) availability of an appropriate business entity to provide the service (e.g. car repair shop, aircraft maintenance depot, etc.);
   (b) availability of appropriately skilled service personnel;
   (c) availability necessary facilities, tools and systems (e.g. diagnostic systems, repair tools, etc.); and
   (d) availability of components and repair parts.

In most cases, another factor of obtaining service is whether or not the price or cost of the service is acceptable to the operator of the vehicle. In some cases, such as having a car indicator illuminate while on a cross-country trip or visiting a city away from home, the driver may anticipate being charged an exorbitant amount for a routine repair, and as such, may decide not to seek service until returning to his or her home town, further increasing his or her risk for greater vehicle damage and possibly causing safety problems.

As a result, while ample diagnostic information to determine a needed service and replacement component is often collected by vehicle on-board computers and sensors, and while some operational time before arriving at a point of possible service is often available (e.g. driving time to next town, flight time to land at next airport, travel time to next train depot, etc.), this time is not wisely used to search for appropriate service providers and to negotiate for acceptable service cost. Normally, the operator of the vehicle will begin these processes after arriving at the next point of service, which may incur additional costs (e.g. overnight shipping of parts, hotel stays, rental vehicles, etc.) and may cause undesirable delays to the itinerary.

Many vehicle operators and vehicles are equipped with communications systems (e.g. radio, wireless telephones, etc.) which allow them to communicate to some degree their problem while in transit, and to attempt to set arrangements for service at the next point of service. However, this can be ineffective as it can be very difficult, for example, for a car driver to obtain quotes for parts and service while driving on a highway, especially because he or she is not privy to the detailed error codes stored in the on-board computer's memory thereby making an accurate diagnosis difficult.

Still other systems, such as General Motor's On Star™ system, provides for triggering of communications such as a cell telephone to call to an operator when certain conditions are detected, such as deployment of an airbag. Generally, this only helps the driver get in contact with possible assistance, but does not relieve the driver of the mental distraction trying to describe a problem and to negotiate for a service action. Another potentially useful service are cellular-based concierge services, which allows a driver to call a single point of contact to initiate assistance such as scheduling a car maintenance appointment. These services, however, are more general purpose in nature (e.g. making hotel reservations, obtaining show tickets, etc.), and are of limited assistance with handling detailed vehicle trouble and maintenance discussions. In either of these cases, the on-board diagnostic information is neither available to the driver, the assisting telephone operator or concierge for accurate and precise planning of a maintenance service.

Therefore, there is a need in the art for a system and method which utilizes the time available between the first time of detection of a potential problem on a mobile system or vehicle in transit and the time to arrival at a point of service to determine potential providers, obtain quotes from the service providers, select a provider and schedule the service action such that itinerary impact is minimized, safety and convenience to the vehicle operator is maximized, and exorbitant unexpected expenses are eliminated. The system and method disclosed in the related patent application addresses these need to a great degree.

However, most vehicles are provided with a finite set of diagnostic capabilities, based in part on the "hardware" installed on the vehicle such as the sensors and indicators available to the many subsystems, and based in part on the diagnostic firmware or software programmed into the vehicle's control computer and/or subsystems. As a result, to the extent that accurate and complete diagnosis of a vehicle problem can be made with the "resident" hardware and firmware, the system and method of the related patent application may accurately provide for anticipatory brokering and scheduling of service actions, including procurement of appropriate spare parts and scheduling of appropriately skilled service personnel.

In some cases, however, the resident diagnostic capabilities may not be sufficient to accurately or fully diagnose a vehicle failure. In such a case, a vehicle may arrive at the selected service center, and may be connected to a more powerful diagnostic testing system. At this point, the failure may be more accurately pinpointed, but in some cases, the needed part may not be in stock, or an appropriately skilled repair technician may not be on call. For example, assume that a vehicle is traveling on a highway when it experiences a failure in the fuel system. The on-board diagnostics may determine that it is likely a fuel pump problem, so the system and method of the related application would find an acceptable shop with the part and technician on hand at the estimated time of arrival, perhaps two hours in advance. Then, upon arrival at the selected repair shop, it is determined that the fuel pump on the vehicle is in fine working order, and that the problem is actually in a wiring harness which interconnects the vehicle's control computer to the fuel system sensors, thereby giving a false indication of a failed fuel pump. If the wiring harness is not currently in stock at this shop, or the technician who is qualified to make electrical and electronic repairs to the vehicle is not on duty, the vehicle operator may be faced with a tough decision to proceed traveling without a working fuel system diagnostic capability, or to wait for a technician and/or part to be procured. This may also leave the operator at a disadvantage for securing the best possible price for the service, as his or her car is now "in the shop" and may not be easily moved to another shop. Additionally, the two hours of travel time which has elapsed since the first detection of the failure has not been effectively utilized to secure prompt and cost-effective service for the vehicle.

In such a case, the vehicle operator is relegated to the situation and disadvantages as previously described, despite the existence and use of the system and method of the related patent application. Therefore, there is a need in the art for a system and method which, upon detection of an initial vehicle failure, provides enhanced diagnostic accuracy for the vehicle in transit, and further provides for enhanced anticipatory brokering and resource planning, in order to maximize the likelihood that a needed service will be obtained with minimal perturbation from the vehicle operator's itinerary, and with maximize value.

Further, there is a need in the art to address the rising costs of ownership of computing infrastructure equipment and software. Highly-capable computing systems such as networked servers, and the application programs they run, can require sizable investment, which may not be justified by potential revenues to be realized by the services they enable. Therefore, there is a need in the art for a system and method which provides this enhanced diagnostic accuracy for the vehicle in transit, and provides for enhanced anticipatory brokering and resource planning, in an on-demand, integrated computing environment.

BRIEF DESCRIPTION OF THE DRAWINGS

The following detailed description when taken in conjunction with the figures presented herein provide a complete disclosure of the invention.

SUMMARY OF THE INVENTION

Exemplary embodiments of the present invention integrate the on-board diagnostics capabilities of mobile systems such as vehicles, location based services technologies, and networked supply chain management technologies to provide anticipatory arrangement of required services and maintenance actions. Based upon real-time fault condition detection in a mobile system and upon the system's location and direction of travel, one or more potential geographic points of service, preferably within the scheduled itinerary of travel, is determined.

The fault or trouble indicators are then analyzed to determine if more extensive diagnostic software functions are available for the vehicle, and if so, these diagnostic modules are downloaded to the vehicle and executed. The enhanced results are then received by a server, where the fault or trouble indicators are then analyzed to determine minimum service provider characteristics (e.g. hours of operation, staff qualifications, equipment and parts on-hand, etc.), and quotes or estimates for expected service actions are solicited and collected from partner provider systems.

These quotes are analyzed and presented to the mobile system operator for selection, either manually or automatically, based upon user preferences. If a service provider is selected, the service is scheduled according to an estimated time of arrival of the mobile system, including arranging for parts to be procured in advance such that there is minimal delay to the travel itinerary for the completion of the service.

If no service provider is found or selected, a second wider search for potential providers may be made to minimize deviation from the itinerary, including solicitation of quotes and estimates, selection and scheduling of the service actions.

DETAILED DESCRIPTION OF THE INVENTION

Figure 1:
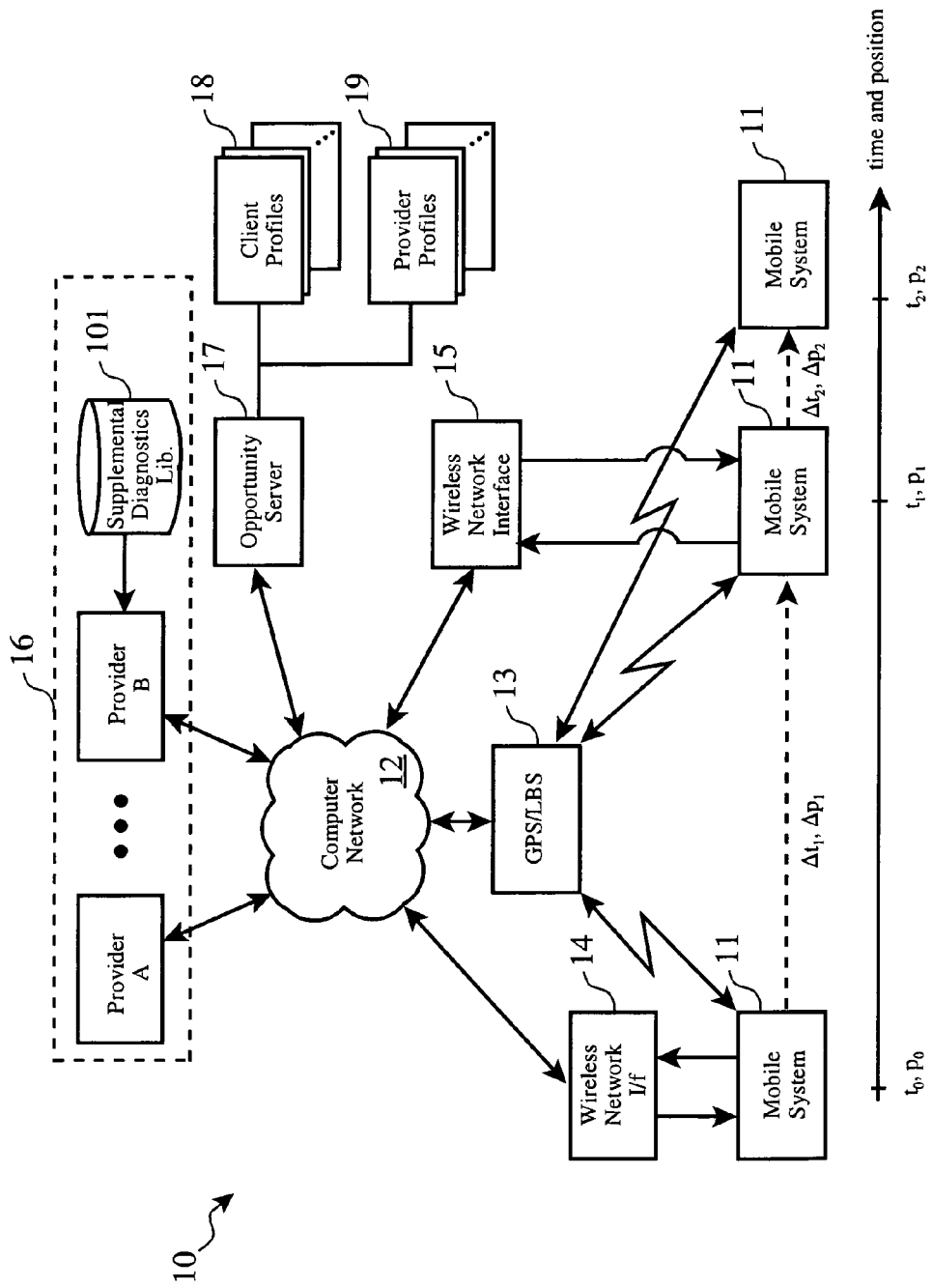
FIG. 1 shows the high level organization of the system according to the invention.

The system and method integrate several well-known technologies via an application server and one or more computer networks, as shown in FIG. 1. The following technologies and terms are used within this disclosure.

Location Based Services ("LBS")—a set of services which are associated with and driven by the location of a device such as a wireless telephone, personal digital assistant, or other computer. LBS may use one of several available technologies to determine the geographic location of a device, including but not limited to GPS, the Federal Communication Commission's Enhanced 911 ("E911") or micro-networks such as open-standard BlueTooth.

Global Positioning System ("GPS")—any one of several available technologies for determining geographic position electronically, including most prevalently use of a network of satellites in geosynchronous orbit and a receiver to pinpoint the receiver's location. Older systems, such as LORAN and TRANSIT, may be used, as well. Regional positioning may be determined using signal triangulation or other methods commonly employed to determine in which cell in a cellular system a transceiver is located.

Computer network—most preferably the Internet, but also possibly local area networks ("LAN"), wireless area networks ("WAN"), private networks and intranets.

Wireless network—any suitable communications network for data transmission and reception including Personal Communications Systems ("PCS"), wireless LAN, light wave (e.g. infrared) networks, and radio-based data links, all of which may be of proprietary nature or may conform to one of many well-known wireless standards.

Mobile System—used generally to refer to any system which is able to diagnose its own faults and failures and which may be transported, and especially, but not limited to, the control and diagnostic computers for vehicles such as automotive Electronic Control Modules ("ECM"). A mobile system, however, does not have to be part of a vehicle, but may be vehicle-born, such as certain electronic systems carried in aircraft and ships which may need maintenance actions.

Enterprise Resource Planning ("ERP")—broadly, a set of activities and technologies employed by businesses to effectively plan and use their resources, including materials ordering, order receipt and fulfillment, billing and accounts payable, personnel scheduling and the like.

Supply Chain Management ("SCM")—a group of technologies and methods for coordinating the activities of multiple suppliers to achieve a goal such as delivering a service with certain materials. SCM includes the computer systems used to receive orders and requests for quotes, systems for determining current and future inventories, methods for calculating labor times and values, automated quote generation systems, and systems for executing orders and deliveries of materials.

Mobile System Diagnostic System—any system used to diagnose a mobile system such as a vehicle or other system which can be transported. We will use terms conventional to the automotive industry for this disclosure to broadly encompass similar terms from other mobile systems industries such as aviation, rail and maritime shipping. For example, we will refer to records regarding detected failures and potentially diagnosed root causes as Diagnostic Trouble Codes ("DTC"), and the computer which performs the monitoring of sensors, recording of failures and conditions, and transmission of DTC records as an electronic control module ("ECM"). It will be evident to those skilled in the art that the invention is not related to an automotive implementation, and that the use of these terms from automotive parlance is for understandability and presentation of a preferred embodiment only.

Turning now to FIG. 1, the general system organization (10) of the invention is shown. A mobile system, such as a car ECM, initially is a location or position $p_0$ at an initial time $t_0$ when an initial fault, failure or out-of-range condition is detected within a monitored system. Using a GPS or LBS subsystem such as a GPS receiver, the initial position $p_0$ is recorded with the DTC regarding the detected conditions, as well as with any DTC's which are the result of diagnostic analysis to determine the root cause of the detected condition.

For example, if a low fuel pressure level is detected, the ECM may record the position of the vehicle at the time the condition is detected in a first DTC, and may check other sensors for indications to assist in diagnosing the root cause of the failure. It may be diagnosed that the fuel filler cap may need to be checked or replaced. This diagnosis may be recorded in a second DTC, in typical ECM systems. According to the preferred embodiment, DTC's are recorded in a format commonly understood by automotive diagnostic computers, such as the International Standards Organization's Controller-Area Network ("CAN") or Society of Automotive Engineers' J1850 format. Any format which records this information, however, may be equally well employed to realize the invention, especially for non-automotive applications as previously discussed.

These DTC's are then transmitted to an opportunity server (17), via a first wireless network, and secondly by a computer network (12). According to the preferred embodiment, the wireless network interface is an IBM eNetworks Wireless Switch coupled with convention wireless data communications facilities such as a Personal Communications System ("PCS") transceiver. Other wireless network solutions, such as Motorola's Ricochet network, may be employed as well. The computer network is preferably the well-known Internet, but may be a proprietary or private network (e.g. LAN, WAN, etc.).

According to the present invention, the opportunity server (17) may then pass the DTC's on to a supplemental diagnostic provider server (16), such as Provider B, who offers downloadable supplemental diagnostics for this vehicle. In a business sense, this service provider may be the vehicle manufacturer itself, an authorized service shop, or a competitive service provider who is not associated with the vehicle manufacturer. In one variation of embodiment of the invention, bids from multiple potential suppliers for supplemental diagnostics services may be tendered and selected as described in the related patent application.

The supplemental diagnostics provider maintains a library (101) of available, downloadable diagnostic functions. So, for our current example, a provider may have a library with two or three additional diagnostic software modules which analyze the fuel system performance to further diagnose the problem and to isolate the failure. In this example, during the remaining transit of the vehicle from the initial position $p_0$ to $p_1$ during a time interval $\Delta t_1$, a supplemental diagnostic function may monitor engine performance (e.g. does it seem to be missing or getting intermittent fuel supply), as well as the pressure indicator sensor status. If the pressure indicator status changes from OK to failed and back to OK several times while the engine performance seems to be fine, a diagnosis of a failed sensor or sensor wiring lead may be made. The supplemental diagnostic function may also be aware of other sensors which are routed with or bundled with the fuel pressure sensor, and may consider their status and performance to determine if it is more likely a wiring harness problem than a sensor problem.

While the number of combinations of possible failures is large, it is feasible to be stored in a server's memory (e.g. a database or large online storage system), while it is not feasible for the control computer of the vehicle to always have these diagnostic functions resident in memory.

So, the supplemental diagnostic provider's server may then transmit or download to the mobile system (11) one or more supplemental diagnostic functions selected from the library (101) based upon analysis of the initial DTC. The mobile system may then execute the supplemental diagnostic functions, and report updated or expanded DTC's to the opportunity server or directly back to the provider server.

Subsequent to receiving additional or more accurate DTC's, the provider server may download additional diagnostic functions (if available). Or, if it is determined that another service provided may have more appropriate supplemental diagnostics functions, that provider may be allowed to download and execute diagnostics functions.

Eventually, after available and necessary supplemental diagnostics have been performed, the most accurate DTCs are received by the opportunity server, wherein the process proceeds similarly to that of the related patent application to broker and schedule the needed service.

The opportunity server receives the DTC's, which result from the supplemental diagnostic services, consults a set of user profiles to determine any user preferences (19) known for the driver (e.g. preference to take his or her car to dealers only), and then determines if there are any potential providers in the future vicinity of the mobile system (e.g. next or previous town on the travel route). Those potential providers (16) are then issued a bid request using ERP and/or electronic data interchange ("EDI") types of communications. To respond to the request for bid, each provider preferably certifies that they have (or will have) stock of necessary components, qualified staff on hand, and the necessary equipment to complete the maintenance action at the time of estimated arrival of the mobile system. Providers may be eliminated or sorted according to the user preferences, such as manufacturer dealers, automobile association ratings, etc.

One or more providers (16), then, may respond with quotes and estimates, which are then coalesced by the opportunity server (15) for downloading and presenting to the mobile system operator (e.g. car driver) via the computer network (12) and wireless interface (14). Presentation of the operator's options may be made graphically using a display on the vehicle's control panel (e.g. a TFT or LCD display on a car dashboard, computer display on a ship's helm, etc.), or audibly via a speakerphone or stereo system. The vehicle operator may then select a provider, which causes the opportunity server to confirm the bid and appointment to the winning provider.

When the mobile system arrives at the anticipated location $p_2$ on or about the anticipated time of arrival $t_2$, the service action may be made without unnecessary delays waiting for parts, personnel, or shopping for an acceptable cost or price.

If no provider is selected or no acceptable bid is made in the first search, the opportunity server (17) may repeat the search and offer process for a subsequent location $p_2$ and expected time of arrival $t_2$ which is either part of the operator's desired itinerary or within an acceptable deviation from the desired itinerary.

Figure 2:
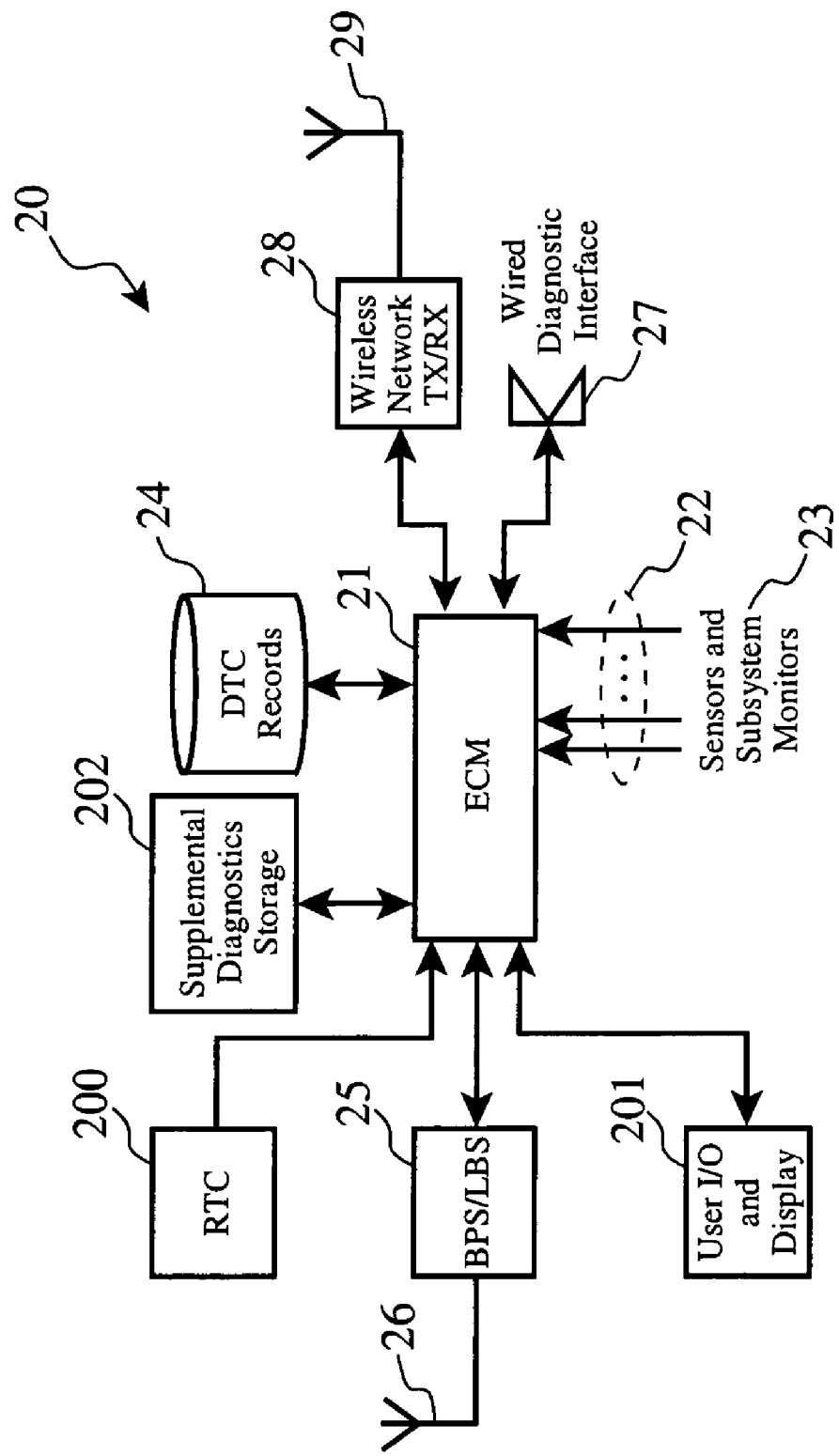
FIG. 2 provides details of an enhanced electronic control module.

Turning to FIG. 2, details of the enhanced ECM (20) of the mobile system according to one available embodiment are shown. The ECM (21), which includes a microprocessor or microcontroller, is interfaced (22) to a plurality of sensors and other subsystem monitors (e.g. controllers in a transmission, fuel injectors, etc.) via a bus such as the aforementioned J1850 or CAN bus, or appropriate proprietary or standard bus according to an alternate embodiment and vehicle application. Through this interface (22), the ECM receives information regarding detected failures, faults and out-of-range conditions, which are recorded in DTCs in the ECM memory (24).

The enhanced ECM (20) is also provided with location means, such as a GPS receiver or LBS-enabled wireless interface (25, 26), as well as a real-time clock (200). The location of the vehicle at the time of the detected event is recorded either with each DTC or in a separate DTC associated with the first DTC. Contact is then initiated through a wireless network interface (28, 29), such as a PCS interface, to the remote opportunity server, and the DTC's are transmitted or uploaded to the server.

The ECM is also provided with storage (202) for the downloaded supplemental diagnostic functions, from which it may execute supplemental diagnostic functions received from provider servers. This may be volatile memory such as random access memory ("RAM"), or may be non-volatile memory, such as FlashROM, battery-backed RAM, or a disk drive.

Using the wireless network interface (28, 29), the enhanced ECM (20) may initially receive downloaded supplemental diagnostics, and to transmit the results of the supplemental diagnostics to the opportunity server or alternatively to the supplemental diagnostics provider server.

Towards the end of the process after supplemental diagnostics have been completed, the wireless network interface (28, 29) is used to receive the coalesced opportunities (e.g. collected and qualified bids or offers from the providers) from the opportunity server, display or present them through the user interface (201), and receive a user selection. Presentation may be through a visual display, such as using an LCD or TFT display, or audibly using text-to-speech or telephone audio channels. The user's selection, such as a speech-recognized "yes" or "no" or input from a touch screen, may be transmitted back to the opportunity server via the wireless interface.

Some of these functions may be provided in combination with each other. For example, GPS operates on transmission of time-based signals from satellites to the GPS receivers, and as such, a GPS receiver includes a real-time clock. Also, a PCS phone which is LBS-enabled can also be employed as the wireless network interface.

Figure 5:
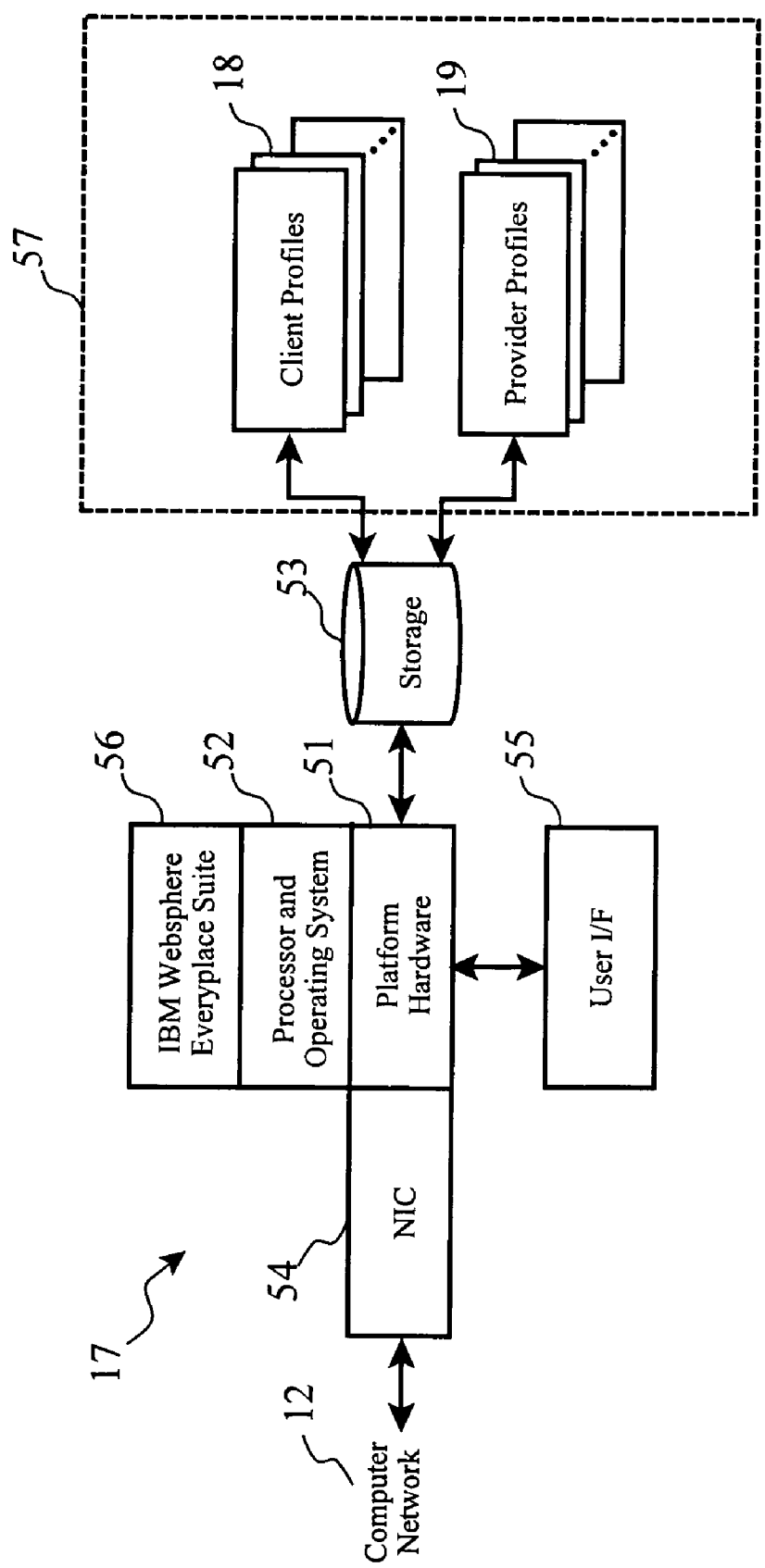
FIG. 5 provides details of the opportunity server and provider server(s).

FIG. 5 provides more details of the opportunity server (17), which includes a common web server computing hardware platform (51) and operating system (52). The computing platform is preferably an IBM eServer such as the IBM i-Series, or any other suitable computer platform such as an IBM-compatible personal computer, Sun Microsystem's server, or other capable computer. The hardware platform is also preferrably equipped with a network interface ("NIC") (54) for communication with the computer network (12) such as the Internet. The NIC (54) may be as simple as a modem, or as sophisticated as a high bandwidth digital subscriber loop ("DSL) or T-1 interface (or better). The hardware platform is also preferrably provided with a set of user interface devices (55) such as a display, keyboard and mouse, for administration and configuration activities.

The operating system is preferrably IBM's AIX operating system, which is well adapted to web server applications, but may also be any other suitable operating system including but not limited to IBM's OS/2, Sun Microsystem's Solaris, Unix, Linux, or Microsoft's Windows. The opportunity server is also preferrably provided with one or more persistent storage devices (53) such as a disk array.

To realize the invention in the opportunity server, a web server suite, preferrably IBM's WebSphere Everyplace Suite, is provided with a number of application programs or scripts to implement the logical processes of the invention, as described in the preceding paragraphs and in more detail in the following paragraphs. The WebSphere product is well known in the industry, and methods and tools for implementing custom logical processes for networked business solutions are commonplace as the WebSphere product is widely in use by businesses, financial institutions, and government agencies around the world. Other suitable a capable software programs and/or suites may be utilized in place of the WebSphere product without departing from the spirit and scope of the present invention.

FIG. 5 may also be referenced for realization of a suitable platform for a service provider server, in which the profiles (57) may be eliminated, and the supplemental diagnostic functions may be maintained in the server storage (53). Scripts or programs to provide logic to select appropriate supplemental diagnostics may be provided on the provider server similarly, as well.

Figure 4:
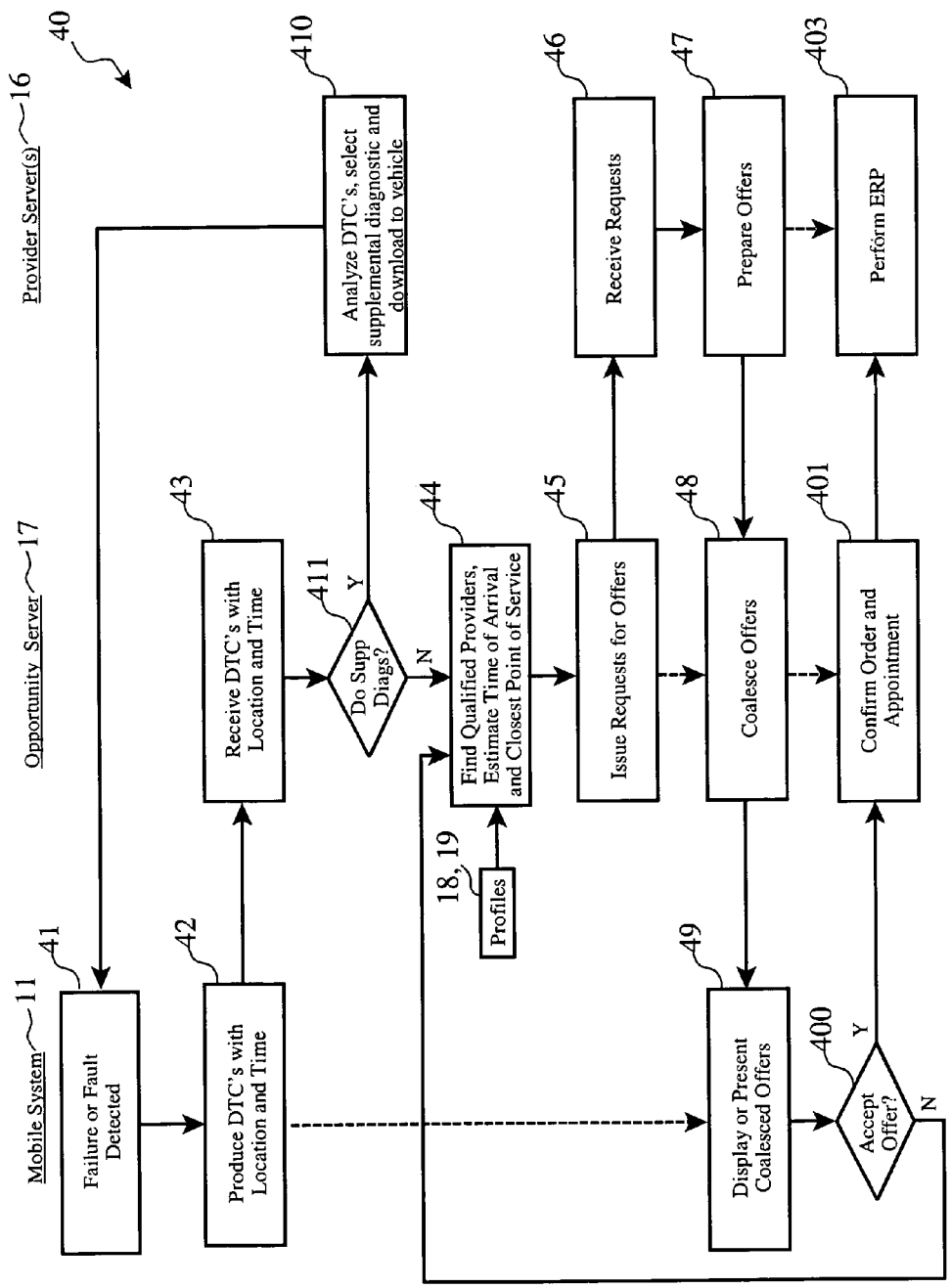
FIG. 4 sets forth the logical process according to the invention.

As such, the logical processes are implemented in part in the mobile system's enhanced ECM (e.g. firmware or software), in part in the customizable logical processes (e.g. Java, scripts, etc.) on the opportunity server, and in part by the provider's servers. These logical processes are shown in FIG. 4 with their cooperative interactions.

When the enhanced ECM detects a fault condition, failure, or out-of-range measurement (41) on the mobile system, it produces (42) one or more DTCs, and transmits those with the mobile system's time and location to the opportunity server, preferably via a wireless network.

The opportunity server then receives (43) the DTC's, and determines if supplemental diagnostics are available for the vehicle (411). If so, then the supplemental diagnostic service provider server (16) is provided with the DTC's. The provider server then analyzes the DTC's, selects one or more supplemental diagnostic functions, and downloads (410) them to the vehicle. The vehicle may execute the supplemental diagnostics and produce new or updated DTC's (42), which are returned to the opportunity server (17). Alternatively, they may be returned to the provider server (16). This cycle (41, 42, 43, 411, 410) of receiving DTC's, analyzing the DTC's, selecting additional diagnostics, and downloading additional and supplemental diagnostics may be performed for several iterations until no additional suitable diagnostic functions are available (e.g. until maximum precision and fault isolation has been achieved).

Upon the conclusion of the supplemental diagnostic phase, the opportunity server proceeds to check the user's profile and the provider profiles (18, 19) which are in the area of the next expected point of service (e.g. next or closest town, port, airport, etc.). Then, the DTC's are processed (45) to create requests for bids for the needed service repair, and are transmitted via the computer network to one or more provider servers.

Each provider servers receive (46) the requests, prepares (47) one or more offers if the provider is able to perform the maintenance service, and transmits these back to the opportunity server.

The opportunity server "coalesces" (e.g. modifies and combines) these offers by first screening them to meet the user's preferences, followed by organizing them into a format which is easily and uniformly presented to the mobile system operator. This may include performing text-to-speech conversion to allow for audible presentation via a telephone channel, adjusting and filtering graphics for presentation on a dashboard display which has limited capabilities, and minimizing text for quicker reading.

The coalesced offers are then transmitted preferably on the wireless network to the enhanced ECM, where they are presented to the mobile system operator (49) through display, audio, or both. The user can then accept an offer (400), such as by making a verbal election or touching an icon on a touchscreen, which results in the selection being transmitted to the opportunity server, which in turn performs a confirmation transaction (400) with the winning provider server. The selected provider server then performs enterprise resource planning functions (403) to order and deliver replacement parts to the point of service, schedule appropriately skilled personnel to be on call at the expected time of arrival, and to reserve an appointment for service.

If the mobile system operator declines all offers (402), then the opportunity server may widen the "bid pool" to include service providers which are located at a subsequent point of service (e.g. two towns away, two ports away, etc.), and/or which do not completely meet the user's preferences. For example, if the user prefers to have his car repaired at dealer-owned shops but no dealers are found, the bid pool is widened to include any qualified shops for the user's make of car.

To annotate FIG. 4 by way of example, suppose a car modified according to the present invention in route from Dallas to Austin, Tex., undergoes a failure in the fuel system. The ECM detects that fuel pressure is abnormally low, but that sensors on the fuel injectors indicate acceptable fuel flow. This causes a first DTC to be created for a low fuel pressure, and a second DTC to be created for a potential root cause of a loose or damaged fuel filler cap (42). Additionally, the location of the vehicle is determined using GPS, and a third time-location DTC is created.

When the opportunity server receives (43) these 3 DTC records, it immediately contacts a supplemental diagnostics provider server, which then selects additional diagnostic functions and downloads them to the vehicle. Following the example scenario previously discussed, these supplemental diagnostics then determine that it is likely a sensor or wiring problem, and not likely a fuel pump or filler cap problem.

Upon receipt of the final, more resolute DTC's, the opportunity server consults the user's profile and finds that he prefers to have his car repaired by the dealers associated with the manufacturer of his vehicle. So, using the location information, a database of providers is searched looking for dealers in the next town where the vehicle will be arriving, perhaps Waco, Tex., and towns which the vehicle has recently passed, perhaps Temple, Tex. This determination of points of service within the vehicle's vicinity can be made several ways. In its simplest form, the user may input the towns on the ECM's user interface, which can be included in the third DTC.

Alternately, two successive GPS measurements can be made, which can be used to calculate vehicle direction and velocity, which can also be included in the DTC and used by the opportunity in conjunction with a digital map to determine upcoming towns on the vehicle's path. An estimated time of arrival can also be either calculated using this information, or provided directly by the vehicle operator.

Once a set of qualified providers has been determined, requests for bids can be transmitted to the provider's servers online, through means such as EDI, email, fax, etc. The providers' servers receive the requests, and in this example, determine if they can have parts (e.g. a fuel cap for the user's make and model of car) and skilled staff on hand at the estimated time of arrival of the vehicle. An offer can be generated, if desired, and transmitted back to the opportunity server, again using e-mail, EDI, fax, etc.

The opportunity server collects all of the returned offers, formats and filters (e.g. "coalesces") them for presentation to the user, and sends them to the vehicle using the wireless network. In our example, let's assume that the quote price from two dealers is too high for the driver to accept, so he rejects (102) all of the offers, which allows the opportunity server to search for dealers in the next farther towns, perhaps Austin, Tex., and Grand Prairie, Tex., as well as for non-dealer service shops in Waco capable of performing the repairs. Requests for bids are produced and transmitted (45), and offers from 2 dealers in Austin and a Pep Boys store in Waco are received, coalesced (48), and presented (49) to the driver.

The driver then may select a lower priced dealer offer in Austin, if available, or a closer offer from Pep Boys if it is less expensive, which then results in the scheduling (403) of the service at the selected provider's facilities.

Software Deployment

Figure 3A:
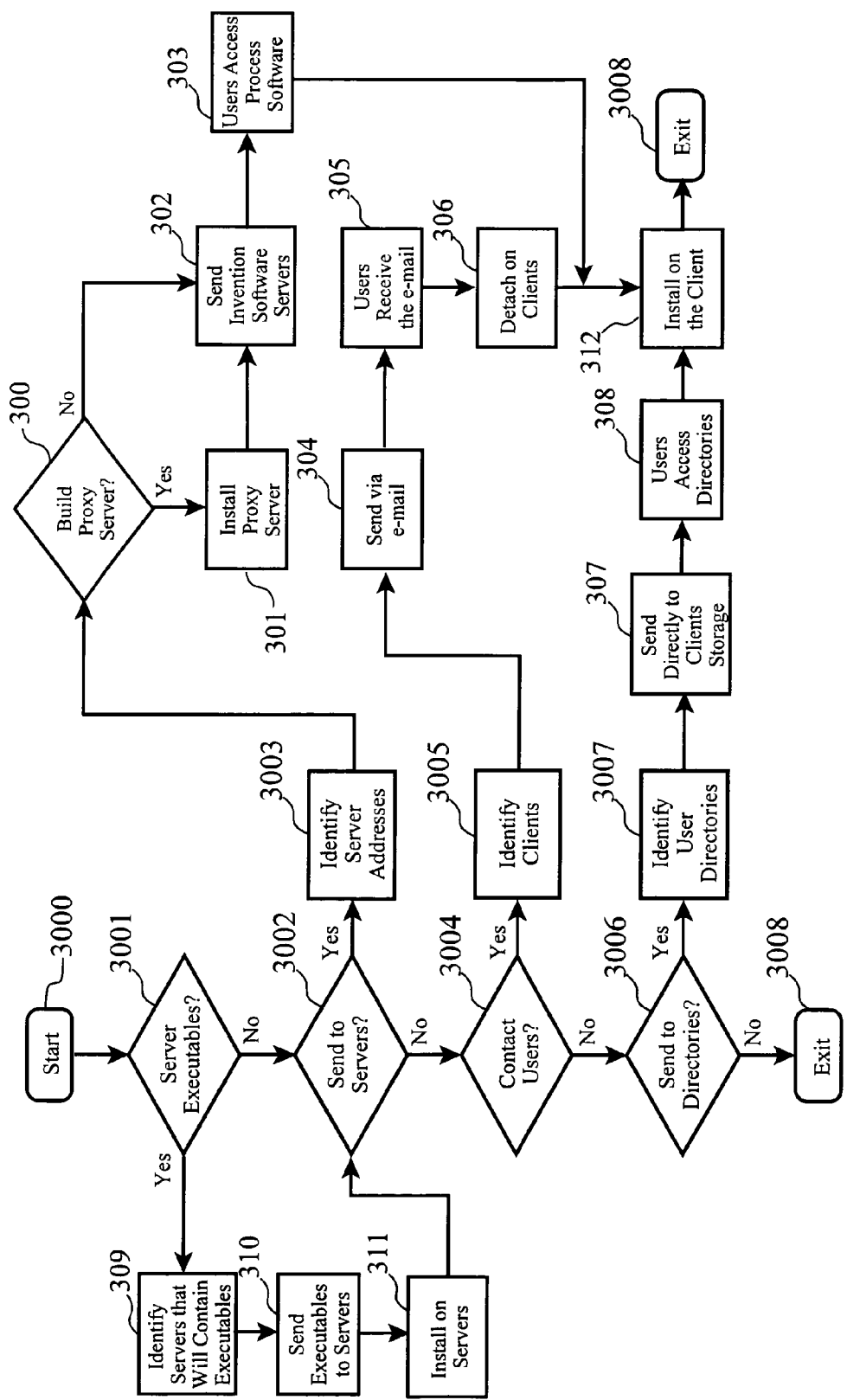
FIG. 3a sets for a logical process to deploy software to a client in which the deployed software embodies the methods and processes of the present invention.

According to one embodiment of the invention, the methods and processes of the invention are distributed or deployed as a service to by a service provider to a client's computing system(s). Turning to FIG. 3a, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or its copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as but not limited to sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration

According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
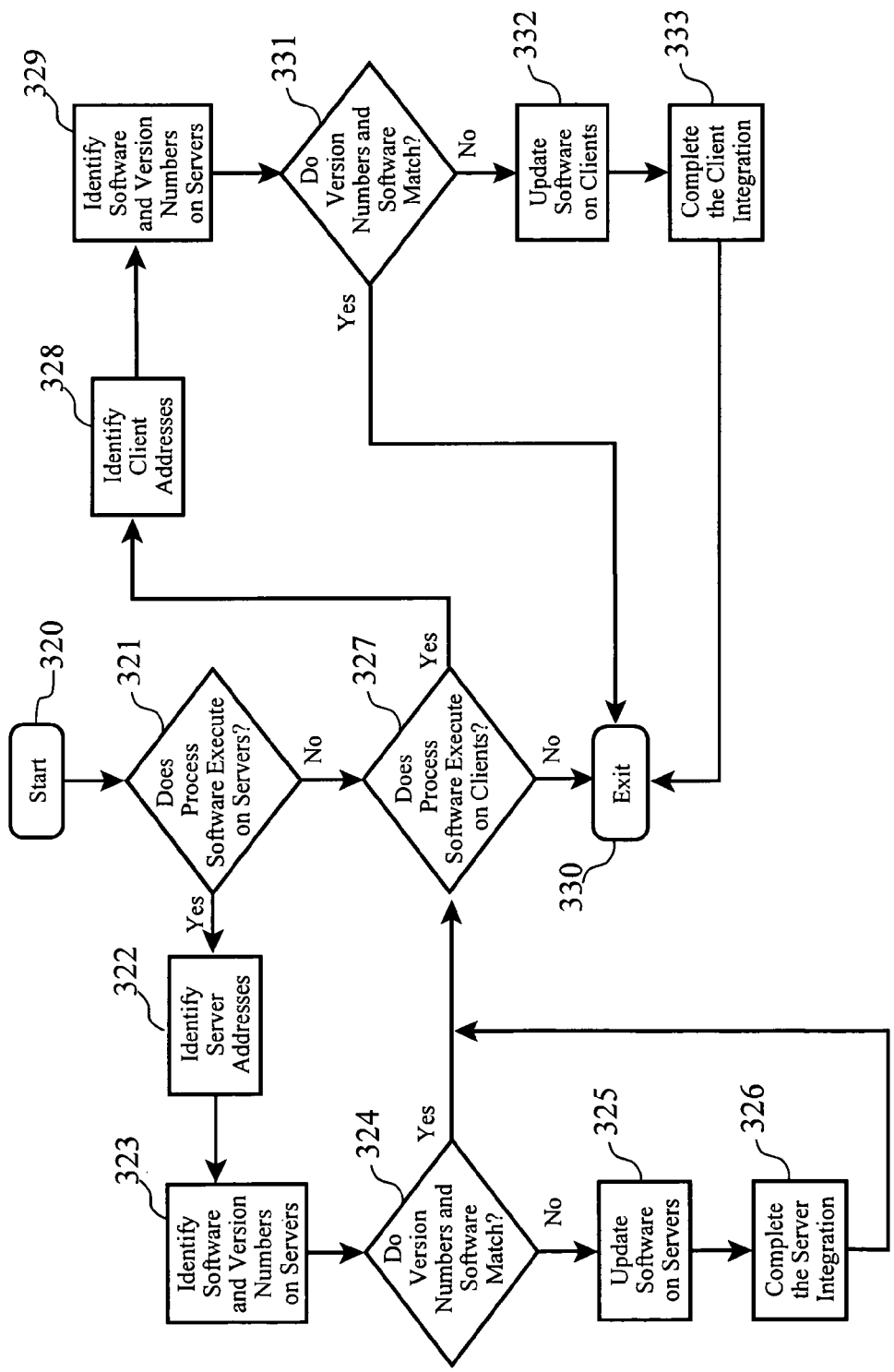
FIG. 3b sets forth a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

On-Demand Computing Services

According to another aspect of the present invention, the processes and methods disclosed herein are provided through an on-demand computing architecture to render service to a client by a service provider.

Figure 3C:
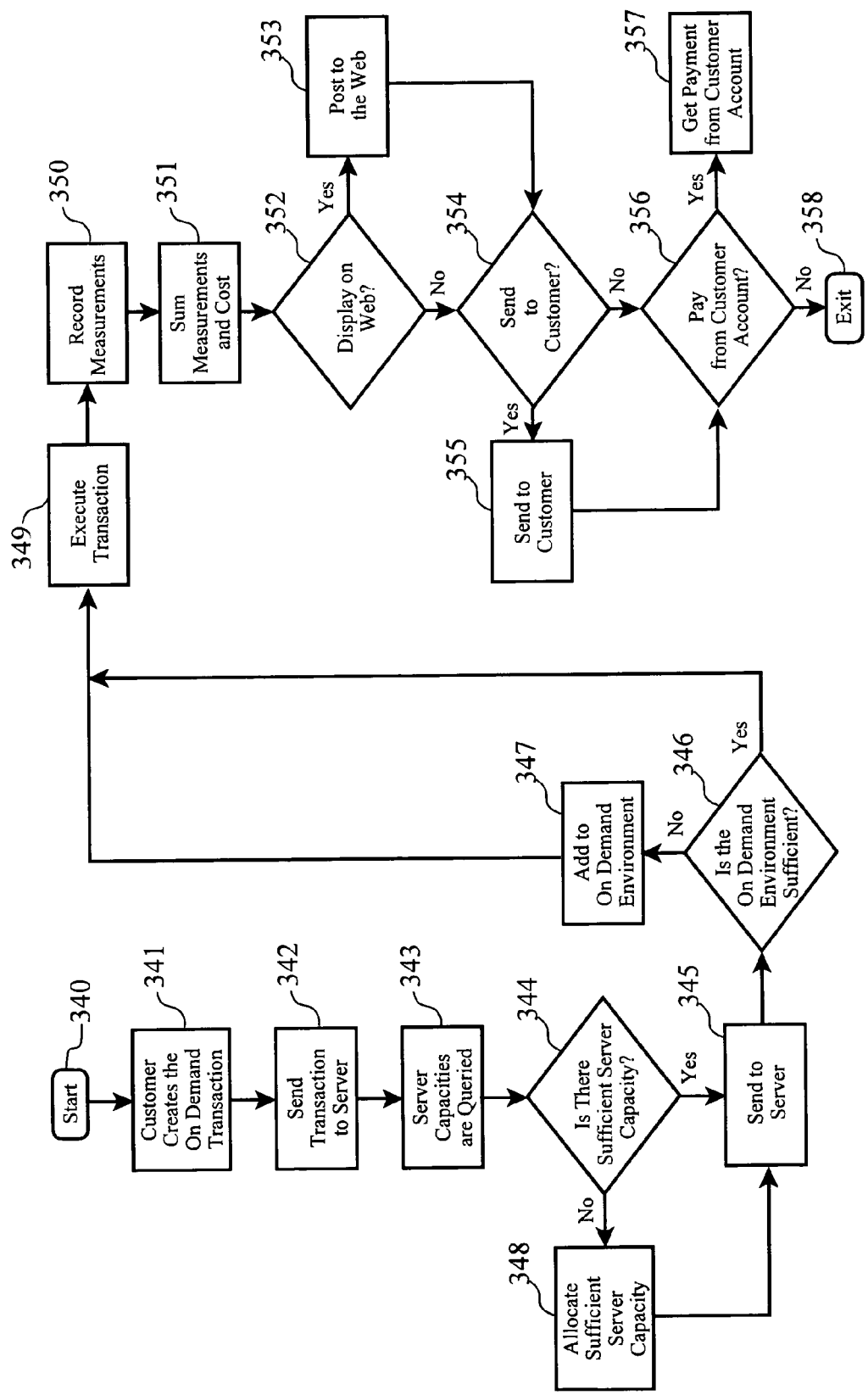
FIG. 3c sets forth a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On Demand environment the main server can initially be the only server, then as capacity is consume other servers are added to the On Demand environment.

The server central processing unit ("CPU") capacities in the On Demand environment are queried (343). The CPU requirement of the transaction is estimated, then the servers available CPU capacity in the On Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity then the transaction is sent to a selected server (345).

Before executing the transaction, a check is made of the remaining On Demand environment to determine if the environment has sufficient available capacity for processing the transaction. This environment capacity consists of such things as but not limited to network bandwidth, processor memory, storage etc. (345). If there is not sufficient available capacity, then capacity will be added to the On Demand environment (347). Next the required software to process the transaction is accessed, loaded into memory, then the transaction is executed (349).

The usage measurements are recorded (350). The usage measurements consists of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On Demand costs be posted to a web site (352) then they are posted (353). If the customer has requested that the On Demand costs be sent via e-mail to a customer address (354) then they are sent (355). If the customer has requested that the On Demand costs be paid directly from a customer account (356) then payment is received directly from the customer account (357). The last step is to exit the On Demand process.

VPN Deployment

According to another aspect of the present invention, the methods and processes described herein may be embodied in part or in entirety in software which can be deployed to third parties as part of a service, wherein a third party VPN service is offered as a secure deployment vehicle or wherein a VPN is built on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
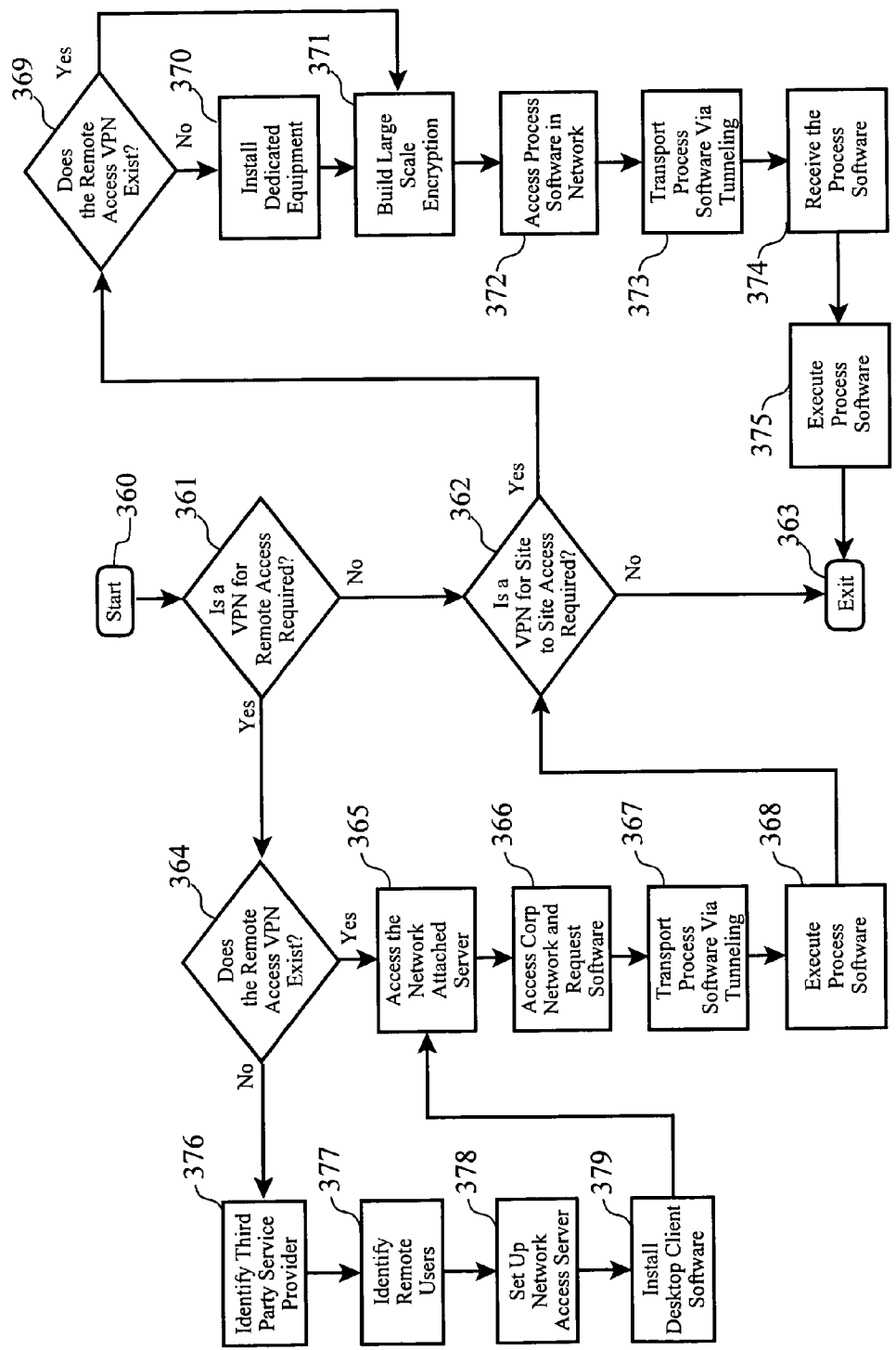
FIG. 3d sets forth a logical process to deploy software to a client via a virtual private network, in which the deployed software embodies the methods and processes of the present invention.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Conclusion

The invention presented herein meets the objectives and needs not presently met by systems and methods currently available. It allows an operator of a mobile system or vehicle to effectively schedule and negotiate for service actions while in transit, with minimized delay and perturbation to a desired itinerary or schedule, while incurring minimal unexpected expenses. It further allows the on-board or resident diagnostic capabilities of a vehicle to be intelligently supplemented by a server provider, thereby increasing the likelihood of receiving such a service action within the expected resolution time and cost while minimizing the need for on-board program storage of the vehicle control computer.

What is claimed is:

1. A computer-implemented method for conducting a transaction in an on-demand computing environment for providing an enhanced diagnostic service for mobile systems comprising:
    determining if any downloadable supplemental diagnostic functions are available to isolate a failure according to a service signal from a mobile system;
    downloading one or more available supplemental diagnostic functions to the mobile system for execution;
    coalescing one or more offers for a repair service according to results of the execution of the downloaded diagnostic functions;
    presenting the coalesced offers to an operator of the mobile system;
    executing the diagnostic function by an on-demand computing system wherein transactions provided by the diagnostic function are automatically shared by simultaneously serving multiple customers;
    differentiating and recording by a usage parameter recorder each customer's usage of the diagnostic functions according to one or more parameters included in the transactions, the parameters uniquely identifying each customer and a type of transaction conducted for that customer; and
    responsive to a number of simultaneous transactions to any one server exceeding a performance limit of a given server, automatically accessing by a capacity manager one or more additional servers to increase capacity and to share workload.

2. The method as set forth in claim 1 further comprising providing transaction processing capacity to at least one customer using a pay-as-you-go model in which charges are posted for actual computing resource consumption.

3. The method as set forth in claim 1 further comprising:
    collecting by a billing server from a transaction server one or more service consumption measurements for a customer;
    periodically summing the collected measurements for the customer;
    multiplying the summed measurements by a unit cost factor to yield a total process application service cost for the customer; and
    posting the total process application service cost to the customer for payment collection.

4. A system for conducting a transaction in an on-demand computing environment for providing an enhanced diagnostic service for mobile systems, comprising:
    a computer-readable storage memory encoded with transaction-oriented process computer instructions disposable in a shared file system and configured to:
        determine if any downloadable supplemental diagnostic functions are available to isolate a failure according to a service signal from a mobile system;
        download one or more available supplemental diagnostic functions to the mobile system for execution;
        coalesce one or more offers for a repair service according to results of the execution of the downloaded functions; and
        present the coalesced offers to an operator of the mobile system;
    an on-demand computing system configured to execute the process computer instructions wherein transactions provided by the supplemental diagnostic functions are automatically shared by simultaneously serving multiple customers;
    a usage parameter recorder configured to differentiate and record each customer's usage of the supplemental diagnostic functions according to one or more parameters included in the transactions, the parameters uniquely identifying each customer and a type of transaction conducted for that customer; and
    a capacity manager configured to, responsive to a number of simultaneous transactions to any one server exceeding a performance limit of a given server, automatically access one or more additional servers to increase capacity and to share workload.

5. The system as set forth in claim 4 wherein the capacity manager and the usage parameter recorder are further configured to provide transaction processing capacity to at least one customer using a pay-as-you-go model in which charges are posted for actual computing resource consumption.

6. The system as set forth in claim 5 wherein the resource consumption is metered in at least one unit selected from a group consisting of processor units of time, processor operations, number of transactions completed, network bandwidth utilized, memory usage, storage usage, and number of communications packet transfers completed.

7. The system as set forth in claim 5 wherein the pay-as-you-go model further comprises automatically requesting payment by a service provider directly from a customer account at a banking or financial institution.

8. The system as set forth in claim 5 further comprising:
    a billing server configured to collect from a transaction server one or more service consumption measurements for a customer; and
    a charge calculator configured to periodically sum the collected measurements for the customer, to multiply the summed measurements by a unit cost factor to yield a total process application service cost for the customer, and to post the total process application service cost to the customer for payment collection.

9. The system as set forth in claim 4 wherein the capacity manager is further configured to increase transaction handling capacity and to share workload responsive to exceeding a measured aggregate capacity limit of a server selected from a group consisting of maximum network bandwidth, maximum memory usage, and maximum storage usage.

10. A method for deploying and using a virtual private network for controlling the flow of private reply messages responsive to a broadcast message in a messaging system, the method comprising:
   responsive to determining remote access to broadcast-with-private-reply supplemental diagnostic program is required, transmitting the program to a client via the unsecure network using the secure tunneling;
   responsive to determining that site access to the supplemental diagnostic program is required, transmitting the program to a client via an unsecure network using secure tunneling; and
   executing the supplemental diagnostic by the client device to perform:
      determining if any downloadable supplemental diagnostic functions are available to isolate a failure according to a service signal from a mobile system;
      downloading one or more available supplemental diagnostic functions to the mobile system for execution;
      coalescing one or more offers for a repair service according to results of the execution of the downloaded functions; and
      presenting the coalesced offers to an operator of the mobile system.

* * * * *